Patented Sept. 23, 1952

2,611,760

UNITED STATES PATENT OFFICE 2,611,760

CONDENSATION PRODUCT OF FORMALDEHYDE WITH A COPOLYMER OF A VINYL AROMATIC COMPOUND AND AN ALIPHATIC MONO-OLEFIN AND PROCESS OF MAKING SAME

Edward M. Geiser, Downers Grove, Ill., assignor to Universal Oil Products Company, Chicago, Ill., a corporation of Delaware No Drawing. Application May 18, 1949, Serial No. 94,049

15 Claims. (Cl. 260—73)

This invention relates to a process for the preparation of materials possessing resinous or elastomeric properties and of a predominantly hydrocarbon structure, depending upon the specific types of reactants selected in the preparation thereof. More specifically, the invention concerns the production of resinous or rubber-like products by the condensation of a copolymer of an aliphatic monoolefin and a vinyl aromatic compound with formaldehyde at selected reaction conditions.

By means of the present reaction and utilizing the reactants herein specified, a process is presented, the products of which may be liquid, resinous or elastomeric, depending upon the choice of reactants and reaction conditions utilized in the copolymerization and condensation stages of the present process. The resin-like materials obtainable in accordance with the process have a wide range of utility and are of particular value as the resin ingredient of coating compositions such as lacquers, paints, varnishes, etc. The present products are of predominantly hydrocarbon structure and are soluble in many organic solvents, particularly liquid hydrocarbons and high molecular weight unsaturated fatty acid ester drying oils, with which the present resins may be composited to form drying oil vehicles or varnishes capable of drying to clear, aqueous-and alkali-resistant finishes when the resulting composition is spread in a thin film and exposed to atmospheric oxygen. Variations in the properties of the resulting product and particularly the solubility of the product in various solvents may be obtained by utilizing reactants containing various radicals other than those reactant groups involved in the condensation reaction, typical examples of which include such radicals as halogen, carboxyl, hydroxyl, amino, carbonyl radicals and the like.

One of the primary objectives of the present invention is to provide a process for the production of resinous materials which may be varied in their physical properties from hard, tough materials, to elastomeric, fluid or highly viscous fluid derivatives suitable for use in coating compositions, compositions for water-proofing fabrics, etc.

In accordance with one of its embodiments, the present invention comprises a process for the production of a resinous material by copolymerizing a mono-olefinic hydrocarbon containing from about 4 to about 8 carbon atoms inclusive per molecule with a vinyl aromatic compound and thereafter condensing the resultant copolymer product with formaldehyde.

A more specific embodiment of the invention concerns a process for the production of a resinous material which comprises copolymerizing a vinyl aromatic hydrocarbon with a mono-olefinic hydrocarbon containing from about 4 to about 8 carbon atoms per molecule inclusive at a temperature of from about $-50°$ to about $+50°$ C. in the presence of an acid-acting polymerization catalyst, separating the copolymer product and reacting the same with formaldehyde in the presence of an acidic condensation catalyst at reaction conditions sufficient to eliminate water of condensation from the reaction mixture.

Other objects and embodiments of the invention relating to specific reactants and conditions for effecting the production of the resinous product will be referred to in greater detail in the following further description of the invention.

One of the primary reactants involved in the condensation process to form the present resinous product and herein designated as a copolymer is formed by a catalyzed interaction of an aliphatic mono-olefin containing from about 4 to about 8 carbon atoms per molecule with an aromatic compound containing a vinyl group as a nuclear side-chain thereof, which because of its olefinic unsaturation is capable of copolymerizing with the aliphatic mono-olefin. The aromatic compounds included within the latter group may contain mono- or polycyclic aryl nuclei having attached thereto one or more vinyl groups comprising the active, copolymerizable centers of the compound. Typical of such compounds utilizable in the formation of the copolymer are, for example, styrene, divinyl benzene, in which the vinyl groups may be ortho, meta, or para to each other; alpha methyl styrene, vinyl naphthalene, divinyl naphthalene, alpha-methyl vinylnaphthalene and other vinyl substituted aromatic compounds containing, in general, not more than two vinyl nuclear substituents in which the vinyl group may be substituted by not more than one methyl group. A variation in the properties of the ultimate resin may be effected by utilizing vinyl aromatic compounds in which other substituents may appear on the aromatic nucleus, but which do not interfere with the copolymerization of the compound with the aliphatic mono-olefin. Such nuclear substitutents may include halo, nitro, amino, hydroxyl, and alkoxy groups on one or more of the aromatic nuclear positions. Typical of the vinyl aromatic compounds which may be substituted by other generally non-reactive groups are such compounds as ortho-vinylphenol, meta-vinylphenol, meta-nitrostyrene, vinyl anisole, ortho-, meta-, or para-chlorostyrene and others.

The additional substituents on the aromatic nucleus of the vinyl compound, in general, modifies the melting point and solubility of the ultimate resin in various organic solvents.

The aliphatic mono-olefinic reactant copolymerizable with the vinyl aromatic compound to form the primary reactant condensible with the formaldehyde reactant to form the final resin product of the present invention is further characterized in that it contains from about 4 to about 8 inclusive carbon atoms per molecule and is preferably selected from the branched chain mono-olefins because of the generally greater reactivity of the latter olefin monomers in the copolymerization reaction. Typical mono-olefins utilizable in the copolymerizaion reaction, either individually or in admixture with each other, include normal and isobutylene, the amylenes, preferably isoamylene, the hexylenes, the heptylenes and octylenes. For this purpose, a suitably boiling fraction of a cracked petroleum distillate may be utilized as the aliphatic olefin charge to the copolymerization reaction. The lower molecular weight members of the above group, preferably isobutylene, are generally preferred because of their higher degree of reactivity in the copolymerization reaction, although the reactivity of the higher molecular weight members of the series may be enhanced by utilizing higher copolymerization temperatures and/or more active catalysts of the group hereinafter specified.

The copolymerization of a vinyl aromatic compound with an aliphatic mono-olefin in the formation of one of the primary reactants for the production of the present resinous product is effected at temperatures of from about −70° to about 20° C., preferably from about −20° to about 0° C. and in the presence of a catalyst which accelerates the copolymerization reaction selected from the acid-acting inorganic halides and certain organic or inorganic complexes thereof generally recognized by the art as catalyzing copolymerization reactions. One of the preferred classes of acid-acting catalysts utilizable in the present copolymerization reaction includes the acid-acting complex combinations of the inorganic halide with an inorganic or organic compound in a molecular association of the components involved. The individual inorganic halides possessing catalytic properties for the reaction herein considered comprise generally the Friedel-Crafts catalysts, such as anhydrous aluminum chloride, aluminum bromide, boron trifluoride, iron chloride, tin chloride, zinc chloride, vanadium chloride and others. Of the acid acting metal halide addition complexes, the compound combined with the inorganic halide may be either inorganic or organic, the organic complexes being generally preferred in the present copolymerization reaction. Typical of the suitable inorganic metallic halide complex catalysts are such composites as aluminum chloride-potassium chloride, aluminum chloride-sodium chloride, zinc chloride-magnesium chloride, and others. The Friedel-Crafts inorganic halide combinations with organic compounds are generally prepared utilizing certain organic oxygen-containing compounds as the preferred organic complex-forming components of the catalyst. Suitable organic oxygen-containing compounds for this purpose include the ketones, the alcohols, the carboxylic acids, the organic nitro compounds, and others generally known to the art. Particularly desirable complexes of the latter type include the boron trifluoride etherates, the aluminum chloride alcoholates, the aluminum chloride and aluminum bromide ketonates, the zinc chloride alcoholates, etc.

The molar proportion of mono-olefin to vinyl aromatic compounds charged to the copolymerization reaction may be varied over a considerable range of from about 1 to 10 to about 10 to 1 of the respective monomers, to provide copolymers of widely varying physical properties. The preferred copolymers for the present reaction are liquid to semi-solid products formed by the reaction of substantially equimolecular proportions of the monomers. Depending upon the type of catalyst utilized in the copolymerization reaction, the latter may be recovered from the copolymer product by washing the product with water, or the catalyst may be neutralized by addition to the product of an alkaline base, such as an amine or ammonia. The copolymerization reaction mixture may also be extracted with a suitable solvent immiscible with the copolymer, but capable of dissolving the catalyst from the copolymerization reaction mixture, such as an alcohol (preferably ethanol) an ester, such as ethylacetate, or an ether, such as diethylether.

Following the initial copolymerization stage of the process, the copolymer product thereof, which may be a viscous or semi-solid liquid is condensed with formaldehyde in any of its monomeric or polyomeric forms, such as paraformaldehyde (trioxymethylene) in the presence of an acidic condensation catalyst and at temperatures of from about 20° to about 120° C. Depending upon the molecular weight of the copolymer reactant, the amount of formaldehyde utilized in the condensation reaction mixture is from about 1% to about 50% by weight of the copolymer, the amount utilized preferably being in excess of that required to combine completely with the copolymer, the excess, if desired, being subsequently removed by treatment of the resin following the condensation reaction.

The acidic catalysts which accelerate the condensation of the copolymer with the formaldehyde reactant may be selected from the organic or inorganic acids having dissociation constants greater than $1 \times 10^{-5}$ and are preferably of the non-oxidizing type, thus removing from consideration such acids as sulfuric acid and nitric acid, which have a deleterious effect on the resin product at the temperatures utilized to effect the condensation reaction. The preferred acid condensation catalysts are the organic acids having relatively high acidities, such as oxalic acid, the mono-, di-, and trichloroacetic acids, maleic acid, malonic acid, picric acid, tartaric acid and others. The acid is preferably present in the reaction mixture in an amount sufficient to obtain the desired catalytic effect, generally from about 0.5 to about 10% by weight of the reaction mixture. The acid may be subsequently removed from the resinous product by extraction with a suitable solvent, such as water or an organic solvent such as ethyl alcohol, or alternatively, the acid catalyst may be allowed to remain in the resinous product, especially when the catalyst utilized is an organic acid. Extraction is, however, preferred when it becomes desirable not only to remove the catalyst from the resin but any excess of the formaldehyde reactant charged to the condensation reaction as well.

The following examples are presented for purposes of illustrating the invention with respect to specific embodiments thereof; however, said examples are not intended to restrict the scope of the invention in strict accordance therewith.

*Example I*

45.1 grams (0.434 mole) of freshly distilled styrene and 24.1 grams of isobutylene (0.434 mole) were mixed in a resin flask immersed in a Dry Ice-acetone bath and equipped with a mechanical stirrer. With vigorous stirring, approximately 0.7 gram (1% of the reaction mixture) of boron trifluoride etherate catalyst was added to the mixture of hydrocarbons while the temperature was maintained at approximately −20° C. An exothermic reaction occurred which increased the temperature of the reaction mixture to a maximum of about 75° C. Stirring was continued for an additional 2 hours, the product becoming quite viscous during this interval. The viscous liquid product was washed with dilute sodium carbonate solution, thereafter extracted with alcohol and the product reserved for subsequent treatment. The yield of polymer was 88% based upon the isobutylene consumed, and the product had a cryoscopic molecular weight of approximately 711.

30 grams of the above copolymer was mixed with 10 grams of trioxymethylene and 2 grams of oxalic acid catalyst and the resulting reaction mixture maintained at a temperature of from about 40° to about 60° C. for several hours, resulting in the production of a rubber-like resinous material which was substantially colorless and soluble in petroleum solvents.

An additional sample of the copolymer when reacted with trioxymethelene at approximately 120° C. yielded a hard, solid moldable material having a slightly greater color than the resinous product obtained at the lower reaction temperature.

*Example II*

45.1 grams of freshly distilled styrene (0.434 mole) and 12.1 grams of isobutylene (0.217 mole) were mixed in a mechanically stirred reaction vessel submerged in a Dry Ice-acetone mixture to maintain the reactor contents at approximately −20° C. As the reaction mixture was vigorously stirred, approximately 1% by weight thereof of a boron trifluoride etherate catalyst was introduced into the mixture of hydrocarbons drop-wise over a period of about 5 minutes. The mixture was stirred for an additional two hours, producing a yield of approximately 97% of a semi-solid copolymer product having a cryoscopic molecular weight of approximately 1000.

30 grams of the above copolymer product was mixed with approximately 10 grams of trioxymethylene and 1 gram of oxalic acid and heated at a temperature of from about 100° to about 120° for several hours to yield a solid, tough resinous material which dissolved readily in hydrocarbon solvents.

I claim as my invention:

1. A process for the production of a resinous material which comprises condensing formaldehyde with the copolymer of a vinyl aromatic compound and an aliphatic mono-olefin containing from about 4 to about 8 carbon atoms per molecule in the presence of a non-oxidizing acid condensation catalyst having a dissociation constant greater than $1 \times 10^{-5}$.

2. The process of claim 1 further characterized in that said aliphatic mono-olefin is an iso-olefin.

3. The process of claim 1 further characterized in that said aliphatic mono-olefin is isobutylene.

4. The process of claim 1 further characterized in that said vinyl aromatic compound and said mono-olefin are the sole components of said copolymer.

5. The process of claim 1 further characterized in that said copolymer is a hydrocarbon.

6. A process for the production of a resinous material which comprises condensing formaldehyde with the copolymer of a mono-nuclear vinyl aromatic compound and an aliphatic mono-olefin containing from about 4 to about 8 carbon atoms per molecule in the presence of a non-oxidizing acid condensation catalyst having a dissociation constant greater than $1 \times 10^{-5}$.

7. The process of claim 6 further characterized in that said mono-nuclear vinyl aromatic compound is styrene and said copolymer is a hydrocarbon.

8. A process for the production of a resinous material which comprises condensing formaldehyde with the hydrocarbon copolymer of a vinyl aromatic hydrocarbon and an aliphatic mono-olefin containing from about 4 to about 8 carbon atoms per molecule in the presence of a non-oxidizing acid condensation catalyst having a dissociation constant greater than $1 \times 10^{-5}$.

9. The process of claim 8 further characterized in that said aromatic hydrocarbon and said mono-olefin are, respectively, styrene and isobutylene.

10. The condensation product of formaldehyde with a material consisting of the copolymer of a vinyl aromatic compound and an aliphatic mono-olefin containing from about 4 to about 8 carbon atoms per molecule.

11. The condensation product of formaldehyde with the copolymer of a vinyl aromatic compound and an aliphatic mono-olefin containing from about 4 to about 8 carbon atoms per molecule.

12. The condensation product of formaldehyde with the hydrocarbon copolymer of a vinyl aromatic hydrocarbon and an aliphatic mono-olefin containing from about 4 to about 8 carbon atoms per molecule.

13. The condensation product of formaldehyde with the hydrocarbon copolymer of a mono-nuclear vinyl aromatic hydrocarbon and an aliphatic mono-olefin containing from about 4 to about 8 carbon atoms per molecule.

14. The condensation product of formaldehyde with the hydrocarbon copolymer of styrene and an aliphatic mono-olefin containing from about 4 to about 8 carbon atoms per molecule.

15. The condensation product of formaldehyde with the hydrocarbon copolymer of styrene and isobutylene.

EDWARD M. GEISER.

REFERENCES CITED

The following references are of record in the file of this patent:

UNITED STATES PATENTS

| Number | Name | Date |
|---|---|---|
| 2,147,547 | Reiff et al. | Feb. 14, 1939 |
| 2,274,749 | Smyers | Mar. 2, 1942 |
| 2,382,184 | Thompson | Aug. 14, 1945 |
| 2,417,424 | Latham | Mar. 18, 1947 |
| 2,446,536 | Hardy | Aug. 10, 1948 |
| 2,495,286 | Brubaker et al. | Jan. 24, 1950 |

FOREIGN PATENTS

| Number | Country | Date |
|---|---|---|
| 319,444 | Great Britain | Sept. 1929 |